E. BENKA.
MILK BOILER.
APPLICATION FILED MAR. 23, 1914. RENEWED MAR. 8, 1915.
1,149,156.
Patented Aug. 3, 1915.
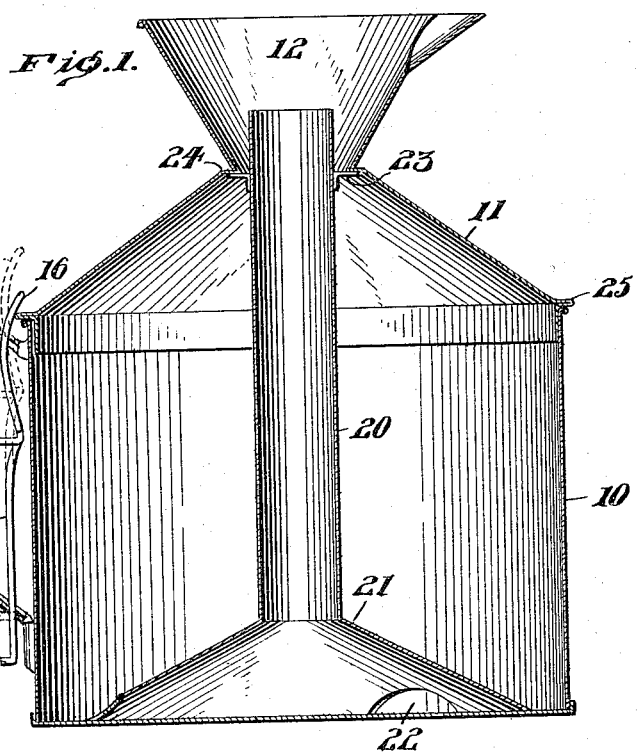
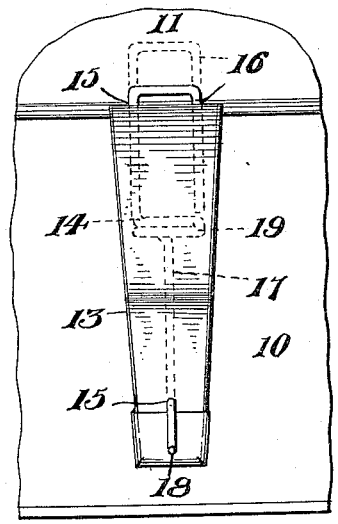
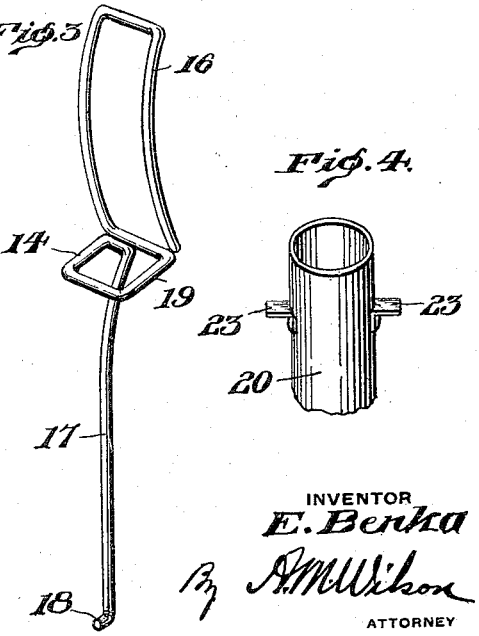
WITNESSES
INVENTOR
E. Benka
ATTORNEY

UNITED STATES PATENT OFFICE.

ELEK BENKA, OF WOODLAND, MAINE.

MILK-BOILER.

1,149,156.  Specification of Letters Patent.  Patented Aug. 3, 1915.

Application filed March 23, 1914, Serial No. 826,683. Renewed March 8, 1915. Serial No. 12,917.

*To all whom it may concern:*

Be it known that I, ELEK BENKA, a subject of the Emperor of Austria-Hungary, residing at Woodland, in the county of Washington and State of Maine, have invented certain new and useful Improvements in Milk-Boilers, of which the following is a specification.

This invention relates to certain new and useful improvements in milk boilers.

The primary object of this invention is to provide a boiling apparatus for milk adapted to prevent the milk from boiling over and at the same time affording a locked funnel top for the boiler.

A further object is to provide a sliding spring latch upon the handle of a boiler and whereby the cover thereof may be readily locked and unlocked from the boiler upon a manual shifting of the latch.

A still further object is to provide a boiler having a lockable cover and adapted for being filled when the cover is in its closing position, and at which time a boiling over of the milk is prevented by a return tube mechanism.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like designating characters refer to corresponding parts throughout the several views:—Figure 1 is a central vertical transverse sectional view taken through the device. Fig. 2 is an end elevation of the handle portion thereof. Fig. 3 is a perspective view of the locking latch detached, and, Fig. 4 is a detail view of the upper portion of the boiling tube.

Referring more in detail to the drawings, the boiler 10 is illustrated with a frusto-conical cover 11 having a flaring funnel-shaped upper extension 12 and whereby the boiler is adapted to be filled with the cover in place thereupon.

The handle 13 which is secured exteriorly of the boiler wall is provided with a sliding wire latch 14 slidably-mounted in the perforations 15 in the upper and lower portions of the handle, the upper loop 16 of said latch having its opposite sides slidably-mounted in separate ones of the perforations 15 while the lower member 17 thereof is positioned through the single lower perforation 15 and prevented from being withdrawn therethrough upon a vertical shifting of the latch by means of the terminal hook 18, an intermediate angularly bent abutment 19 of the latch being furnished as a handle therefor to be grasped by the fingers of the operator in shifting the latch.

A tube 20 having a flaring base 21 is seated within the boiler and upon the bottom thereof and provided with base perforations 22. Projecting lugs 23 adjacent to the top of the tube are adapted to receive the annular shoulder 24 of the cover seated thereon and with the upper end of the tube projecting outwardly within the funnel 12.

From this detailed description, the entire operation of the device will be at once apparent in that with the tube seated upon its base within the boiler and having its upper end projecting within the funnel, any boiling of the milk will cause the same to rise upwardly in the tube 20 and empty into the funnel 12 to take a downward course in its return to the boiler, and thus prevent the milk from boiling over the rim or edge of the cover funnel. The latch being grasped by the abutment 19 is forced downwardly slidably upon the handle 13 until its curved resilient looped portion 16 engages the projecting rim 25 of the cover and against which it is firmly and resiliently seated, thus forcing the opposite portions of the cover into firm locking engagement with the top edge of the boiler. An upward movement of the latch releases the engagement of said looped portion of the rim 25 and thereby permits a removal of the cover from the boiler, it being noted that the locking of the latch firmly seats the rim 25 at all points upon the top edge of the boiler.

While the forms of the invention herein shown and described are what are believed to be preferable embodiments thereof, it is nevertheless to be understood that various forms and modifications thereof may be had without departing from the spirit and scope of the invention as claimed.

What I claim as new and desire to secure by Letters Patent is:—

1. A device of the class described comprising a boiler, a strap handle upon said boiler having two upper and a single lower perforation, a looped wire latch having portions thereof slidably mounted through said perforations, and a cover seated upon said boiler, said latch adapted for resilient seating engagement with said cover in its lower position.

2. A device of the class described comprising a boiler having a strap handle provided with two perforations through its upper and one perforation through the lower portion thereof, a latch comprising a single piece of wire bent into a central abutment and a terminal loop at one end and a hook at the other end thereof and slidably mounted in said perforations, a cover mounted upon said boiler and having an outwardly projecting rim, the looped end portion of said latch adapted for resilient engagement with said rim when said latch is in its lowered position to seat said rim upon the top edge of the boiler.

3. In a vessel, a handle therefor, said handle having perforations in its upper and lower walls, a cover for said vessel having a laterally projecting flange, and a latch vertically slidable in said handle perforations and adapted for engaging with the cover flange.

4. In a vessel, a handle therefor, a cover for said vessel having a laterally projecting flange, overlying the upper edge of said vessel, a wire latch member vertically slidable in said handle and adapted for engaging at its upper end with said cover flange, said wire being angularly bent intermediate its ends to provide an operating hand grip.

In testimony whereof I affix my signature in presence of two witnesses.

ELEK BENKA.

Witnesses:
    JOHN S. TOPOLOSKY,
    FRED L. LYDIC.

Copies of this patent may be obtained for five cents each, by addressing the "Commissioner of Patents, Washington, D. C."